United States Patent Office 3,796,691
Patented Mar. 12, 1974

3,796,691
POLYESTER CONDENSATION CATALYZED BY ORGANOTIN, TRIVALENT ANTIMONY AND PENTAVALENT PHOSPHORUS COMPOUNDS
Kazuya Chimura, Shunichi Takashima, and Masao Kawashima, Otake, Japan, assignors to Mitsubishi Rayon Company Limited, Tokyo, Japan
No Drawing. Filed Sept. 23, 1971, Ser. No. 183,279
Claims priority, application Japan, Sept. 26, 1970, 45/83,794
Int. Cl. C08g 17/015
U.S. Cl. 260—75 R          10 Claims

ABSTRACT OF THE DISCLOSURE

An improved process for producing a linear polyester wherein polycondensation of glycol terephthalate is performed in the presence of (1) a trivalent antimony compound, (2) a phosphorus compound and (3) an organotin compound in the proportions satisfying the following atomic ratios; Sn/Sb>0.2 and P/Sn>1. The resultant polyester exhibits excellent whiteness and transparency and therefore, is particularly useful for a textile fiber and film.

The present invention relates to a process for preparing a colorless linear polyester. More particularly, it relates to an improvement in a process for preparing a linear polyester wherein glycol terephthalate is polycondensed in the presence of an antimony catalytic compound and a pentavalent phosphorus compound, which improvement comprises using, in addition to the two compounds, an organotin compound thereby producing a polyester having improved whiteness and transparency, i.e. in which darkening or grayish color formation inevitably caused by using only a conventional catalytic antimony compound is obviated.

Linear polyethylene terephthalate and copolyesters containing an ethylene terephthalate chain as a main component are particularly useful for textile fibers, films or molded articles. These polyesters are normally prepared by polycondensation at an elevated temperature and a reduced pressure in the presence of a catalyst. As a catalyst, various metallic and non-metallic compounds have been heretofore proposed, among which an antimony compound and a germanium compound are important practically for production on a commercial scale.

Antimony compounds have been used primarily because of their improved catalytic effect and low cost, but there is still a problem. That is, a polyester prepared by using a conventional antimony compound such as antimony trioxide is tinged with undesirable gray or greenish gray, which is due to the metallic antimony deposited by the reduction of the catalytic antimony compound during polycondensation, although the polyester is superior in heat resistance and stability in processing. The color formation is particularly important in the case where the polyester is to be used for textile fibers, films and the like because it leads to a considerable reduction of transparency in the case of films and to a considerable reduction of whiteness in the case of textile fibers resulting in the deterioration of brilliancy in a dyeing process.

Thus, to avoid the problem, several new antimony catalysts have been heretofore proposed, including, for example, such pentavalent compounds as described in Japanese patent publications 10,847/1961 and 6,397/1964; pentavalent organo-antimony compounds represented by the formula $R_3SbO$ or $R_3Sb(OH_2)$, as described in Japanese patent publication 15,999/1968; siloxyantimony compound represented by the formula $(R_XR_YR_ZSiO_m)_n$—Sb[III]

as described in Japanese patent publication 351/1970; antimony salts of aliphatic monocarboxylic acid having at least 12 carbon atoms, as described in British Pat. 1,168,149.

These antimony compounds, however, while being effective for minimizing or avoiding the color formation or darkening of polyesters, have some disadvantages; the pentavalent antimony compounds readily cause side reactions to form undesirable products such as diethylene glycol, which is vigorous in comparison with trivalent antimony compounds; the pentavalent organoantimony compounds and the siloxy-antimony compounds are too expensive because of organometallic compounds; and the antimony salts of aliphatic monocarboxylic acid having at least 12 carbon atoms exercise a slightly less effect for minimizing the color formation than the pentavalent antimony compound and a large amount should be used in comparison with a trivalent antimony compound to ensure a reasonable rate of polycondensation. To sum up, these antimony compounds are also unsatisfactory as a catalyst for use in the manufacture of a polyester.

Thus, avoiding the above-mentioned and other problems, an improved process has now been found which results in a polyester being substantially colorless and having excellent whiteness and transparency even in the case where an antimony catalyst is used, the catalyst being inexpensive and suppressing the undesirable side reaction to diethylene glycol.

According to the present invention, there is provided an improvement in a process for preparing a linear polyester having improved whiteness and transparency wherein glycol terephthalate is polycondensed in the presence of (1) a trivalent antimony compound and (2) a pentavalent phosphorus compound, the improvement which comprises polycondensing glycol terephthalate in the presence of (3) an organotin compound in addition to (1) said trivalent antimony compound and (2) said phosphorus compound, the three compounds being miscible in the polycondensation system and present in proportions satisfying the following atomic ratios;

Sn/Sb>0.2 and P/Sn>1

Many tin compounds minimize the darkening or color-forming effects to a slight degree. However, the organotin compound used in the present invention is more effective than any other tin compound in the minimization. Preferable organotin compounds are those which have at least one Sn—C bond and 2 to 24 carbon atoms in their molecule, and include, for example, the compounds represented by the following formulae;

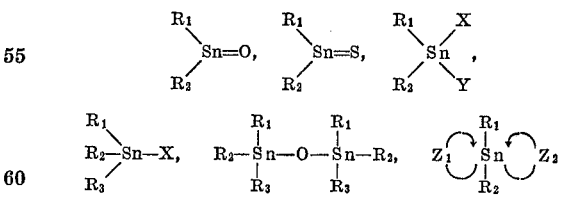

wherein $R_1$, $R_2$ and $R_3$ are identical with or different from each other and are selected from alkyl, cycloalkyl and aryl groups, each having 1 to 12 carbon atoms; X and Y are identical with or different from each other and are selected from halogen, alkoxy group and aliphatic acid group, each group having 1 to 12 carbon atoms; and $Z_1$ and $Z_2$ are identical with or different from each other and are selected from $\beta$-diketone, $\beta$-ketoester and 8-oxyquinoline groups.

Particularly, the following are enumerated as most preferable organotin compounds:

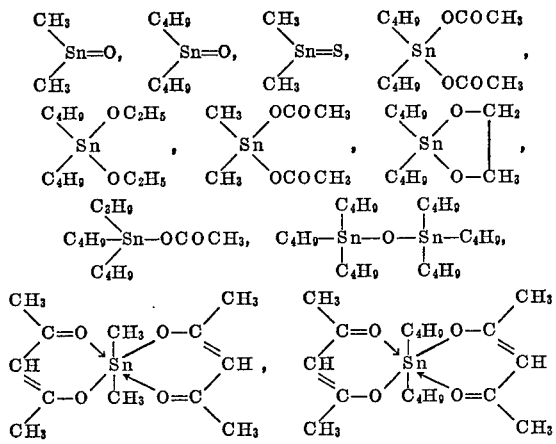

and

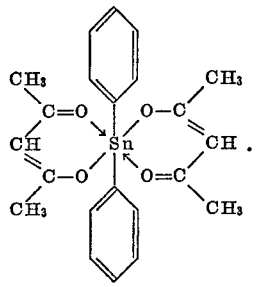

A divalent organotin compound may also be used in the present invention. However, a divalent organotin compound is generally unstable, e.g. alkyltin compounds and aryltin compounds readily react with oxygen in the air and are thereby transformed into a tetravalent organotin compound, i.e. alkyltin oxide and aryltin oxide, respectively. A divalent organotin compound is therefore less practicable than the tetravalent organotin compound mentioned above.

The above-mentioned effect, i.e. the minimization of the darkening or color-formation of polyester is more enhanced by the incorporation of a phosphorus compound, particularly a pentavalent phosphorus compound, in addition to an organotin compound into the polycondensation system. A trivalent phosphorus compound is inferior to some degree in the above-mentioned effect to a pentavalent phosphorus compound. A pentavalent phosphorus compound to be preferably used in the present invention includes, for example, phosphoric acid and its alkyl or aryl ester, trialkylphosphine oxide, triarylphosphine oxide, alkylphosphonic acid and its alkyl or aryl ester, arylphosphonic acid and its alkyl or aryl ester. Particularly, the following are enumerated as most preferably pentavalent phosphorus compounds; trimethyl phosphate, triethyl phosphate, tributyl phosphate, triphenyl phosphate and tricresyl phosphate.

A trivalent antimony compound to be used as a polycondensation catalyst together with an organotin compound and a pentavalent phosphorus compound in the present invention are those miscible in the polycondensation system, which include antimony catalysts known to the art. The most preferable antimony compound is antimony trioxide. Other trivalent antimony compounds may also be used such as, for example, antimony halide such as antimony chloride, antimony bromide and antimony fluoride; antimony sulfide; antimonious acid and metal salt thereof such as Ca antimonite, Mg antimonite, Zn antimonite, Mn antimonite, etc.; antimony glycoxide such as antimony ethylene glycoxide, antimony propylene glycoxide, antimony butylene glycoxide and the like; antimony phenoxide; antimony alkoxide such as antimony glucoxide, antimony ethoxide, antimony methoxide, antimony propoxide, antimony butoxide and the like; and antimony carboxylate such as antimony acetate, antimony propionate, antimony butyrate, antimony formate, antimony benzoate, antimony toluylate and the like.

The most important feature of the present invention lies in the specific combination of the above-mentioned three compounds, i.e. an organotin compound, a pentavalent phosphorus compound and a trivalent antimony compound, which results in polyester having excellent whiteness and transparency and high heat-resistance.

Among the three compounds, the antimony compound appears to play the leading part as the polycondensation catalyst. Accordingly, the amount of the antimony compound used in the production of polyester should generally be within the range of 0.005% to 0.5 % by weight based on the weight of the resulting polyester. For example, when antimony trioxide is used, the amount is preferably within the range of 0.03% to 0.08% by weight.

On the other hand, the amounts of the organotin compound and the pentavalent phosphorus compound should be within the range satisfying the following atomic ratios; $Sn/Sb > 0.2$ and $P/Sn > 1$. When both the ratios are less than the lower limits, undesirable darkening or color formation of the polyester is inevitably developed. Preferable amounts of both the compounds used are such that both atomic ratios of $Sn/Sb$ and $P/Sn$ are within the ranges of 0.3 to 4 and 1.5 to 10, respectively, for the production of polyester having excellent whiteness and transparency. It should be noted however that, when a normal ester interchange catalyst such as calcium compounds and magnesium compounds is further present in hte polycondensation system, the pentavalent phosphorus compound should be used in a greater amount in many cases.

Apparently the particular manner whereby the above three compounds, i.e. a trivalent antimony compound, an organotin compound and a pentavalent phosphorus compound are added to the polycondensation system is not critical. These compounds can be added into the polycondensation system separately or in combination in solid form or as a solution in ethylene glycol, for example. The addition in the form of an ethylene glycol solution is particularly preferred.

The process of the present invention involves the addition of the three compounds which mysteriously interact with each other thereby resulting in a polyester having excellent whiteness, transparency and heat-resistance. Other additives, for example, the ester interchange catalyst as mentioned above or other esterification catalysts such as titanium compound and lanthanum compound and delustrant such as titanium dioxide may be present in the polycondensation system without reducing the desired effect of the present invention.

Glycol terephthalate which is to be polycondensed according to the present invention can be prepared in the normal manner, for example, by the ester-interchange of a lower dialkyl ester of terephthalic acid with glycol or the direct esterification of terephthalic acid with glycol and/or with glycol terephthalate, or the reaction of terephthalic acid with a lower alkylene oxide. Suitable glycols to be used for the esterification or the ester-interchange are those having 2 to 16 carbon atoms, which include, for example, ethylene glycol, 1,4-butanediol, cyclohexane-1,4-dimethanol and mixtures thereof.

The polycondensation of glycol terephthalate may be carried out under normal conditions provided that the stated amounts of the three compounds, i.e. a trivalent antimony compound, an organotin compound and a pentavalent phosphorus compound are present during the polycondensation.

Glycol terephthalate may be polycondensed alone or as an admixture with each other or with a minor amount of, i.e. less than 15% by weight, based on the total weight of the components to be polycondensed, a copolycondensation component such as adipic acid, sebacic acid, phthalic acid, isophthalic acid, diethylene glycol, neopentyl gylcol, cyclohexane-1,4-dimethanol and the like.

The invention will be further illustrated with reference to examples, in which "parts" and "percent" are both "by weight" unless otherwise specified and the intrinsic viscosity [η] of the polymer was determined in a mixture solvent of tetrachloroethane and phenol (1:1) at a temperature of 25° C., and the content of diethylene glycol (referred to hereinafter as "DEG" for brevity in the polymer was determined by gas chromatography after polymer was hydrolyzed with hydrazine.

Both luminous reflectance, represented by Y value, and excitation purity, represented by PI value, of polymers made therefrom are shown in Table I. As is evident from Table I, only when dibutyltin oxide, trimethyl phosphate and antimony trioxide are simultaneously present in an atomic ratio of phosphorus to tin of more than 1, the darkening due to antimony is obviated and a colorless, transparent polyester is obtainable. In Control Example 2, the process of Example 1 was repeated under the same conditions as those of Example 1 except for the use of 5 parts of calcium acetate in place of dibutyltin oxide. In Control Example 3, the process of Example 1 was repeated under the same conditions as those of Example 1 except that trimethyl phosphate was not added and polycondensation was performed at a temperature of 280° C. and at a reduced pressure of 2 mm. Hg for 1 hour.

TABLE I

| Example No. | Atomic ratio of P/Sn(Sn/Sb=0.58) | Characteristics of polymer | | | Characteristics of fiber | | |
|---|---|---|---|---|---|---|---|
| | | [η] | DEG (wt. percent) | Color tone | Y value (percent) | PI value | Remarks |
| Example 1 | 4 | 0.754 | 0.73 | Colorless transparent | 91.4 | 99.7 | Excellent whiteness and luster. |
| Example 2 | 2 | 0.763 | 0.72 | do | 91.3 | 99.7 | Do. |
| Control 1 | 1 | 0.768 | 0.74 | Slight brown, slightly dark | 88.7 | 98.9 | |
| Control 2 | No addition of Sn compound | 0.703 | 0.65 | Grayish green, quite dark | 79.8 | 98.4 | Quite dark. |
| Control 3 | No addition of P compound | 0.725 | 0.72 | Deep blackish brown (insoluble particles were observed therein). | | | | were determined as follows. The sample polymer was spun and drawn in a normal manner to form filaments having a fineness of 75 d/36 fils. The filament test specimen was illuminated by a substantially unidirectional beam in an automatic recording spectrophotometer (manufactured by Hitachi Seisakusho, Japan; Model EPR–2). Reflectance was measured of the test specimen and of a magnesium oxide standard white surface, the latter being used as a standard.

EXAMPLES 1–2 AND CONTROL EXAMPLES 1–3

10,000 parts of dimethyl terephthalate and 7,500 parts of ethylene glycol were heated at temperatures of 150° C. to 220° C. under an atmosphere of nitrogen in the presence of 5 parts of dibutyltin oxide to effect ester-interchange while methanol, thus produced, was continuously distilled off from the reaction mixture. The reaction was completed three hours after its initiation. The reaction product was then heated to remove an excess of ethylene glycol therefrom.

To the reaction products, three trimethyl phosphate solutions prepared by treating (1) 11.2 parts (Example 1), (2) 5.6 parts (Example 2) and (3) 2.8 parts (Control Example 1) of trimethyl phosphate with ethylene glycol were separately added. Further, 5 parts of antimony trioxide were added to each mixture. The mixtures were then gradually vacuumed and finally, polycondensed at a temperature of 280° C. and a pressure of 2 mm. Hg over a period of 2 hours.

Characteristics of the resultant polymers and the fibers

EXAMPLES 3–4 AND CONTROL EXAMPLES 4–5

13,000 parts of bis(β-hydroxyethyl)terephthalate were heated to a temperature of 240° C. under an atmosphere of nitrogen to melt, followed by the addition of an ethylene glycol solution containing 8 parts of trimethyl phosphate, 5 parts of antimony trioxide and (1) 11 parts (Example 3), (2) 4.4 parts (Example 4) or (3) 2.2 parts (Control Example 4) of dibutyltin diethoxide, respectively. The mixture was gradually vacuumed and finally, polycondensed at a temperature of 280° C. and at a reduced pressure of 2 mm. Hg over a period of 2 hours.

Relationship between both atomic ratios of Sn/Sb and P/Sn and characteristics of the resultant polymer and fiber are shown in Table II. Control Example 5 indicates the process wherein polycondensation was carried out without adding dibutyltin diethoxide with all other conditions remaining the same.

TABLE II

| Example No. | Atomic ratio | | Characteristics of polymer | | | Characteristics of fiber | | |
|---|---|---|---|---|---|---|---|---|
| | Sn/Sb | P/Sn | [η] | DEG (wt. percent) | Color tone | Y value (percent) | PI value | Remarks |
| Example 3 | 1.0 | 1.7 | 0.768 | 0.72 | Nearly colorless, transparent | 91.4 | 99.7 | Excellent whiteness and luster. |
| Example 4 | 0.4 | 4.2 | 0.739 | 0.71 | do | 91.3 | 99.6 | Do. |
| Control 4 | 0.2 | 8.4 | 0.724 | 0.68 | Slight grayish green, dark | 88.2 | 99.2 | |
| Control 5 | No addition of Sn compound | | 0.722 | 0.68 | Considerable deep grayish green, quite dark. | 79.6 | 98.1 | Quite dark. |

As is evident from Table II, only when dibutyltin diethoxide, trimethyl phosphate and antimony trioxide are simultaneously present in atomic ratios of Sn/Sb and P/Sn of more than 0.2 and 1, respectively, the darkening caused by antimony is obviated and a colorless, transparent polyester is obtainable.

EXAMPLE 5 AND CONTROL EXAMPLES 6–9

The process of Example 3 was repeated wherein various organotin compounds were separately used, in place of dibutyltin diethoxide of Example 3, in an atomic ratio of Sn/Sb of 1 with all other conditions remaining the same (atomic ratio of P/Sn=1.7). Characteristics of the resultant polymer and fiber are shown in Table III.

ing a Y value of 92.2% and a PI value of 99.6% and had excellent whiteness and luster.

TABLE III

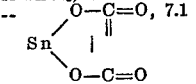

| Example No. | Sn compound added and the amount of same (parts) | Characteristics of polymer | | | Characteristics of fiber | | |
|---|---|---|---|---|---|---|---|
| | | $[\eta]$ | DEG (wt. percent) | Color tone | Y value (percent) | PI value (percent) | Remarks |
| Example 5 | (Bu)₂Sn(OAc¹)₂, 12 | 0.765 | 0.70 | Colorless, transparent | 91.5 | 99.7 | Excellent whiteness and luster. |
| Control 6 | SnCl₂, 6.5 | 0.739 | 1.24 | Grayish green, dark | 84.3 | 98.9 | Slightly dark. |
| Control 7 | [structure], 7.1 | 0.712 | 0.78 | do | 85.2 | 98.8 | Do. |
| Control 8 | SnO₂,² 13 | 0.701 | 0.74 | do | 84.1 | 98.8 | Do. |
| Control 9 ³ | (Bu)₂Sn(OAc)₂, 12 | 0.748 | 1.26 | Colorless, transparent | 88.6 | 99.7 | Excellent whiteness and luster. |

¹ Dibutyltin diacetate.
² Soluble stannic oxide hydrate prepared by hydrolyzing stannic chloride with aqueous alkali.
³ For comparison purpose, the process of Example 5 was repeated wherein 11.5 parts of antimonic acid hydrate were used as pentavalent Sb compound in place of 5 parts of antimony trioxide, in an atomic ratio of Sn/Sb of 1.

It is evident from Table III that an organic compound has a far greater effect in minimizing the darkening of polymer caused by antimony as compared with other tin compounds, and that a pentavalent antimony compound is satisfactory only in the color tone of the polymer, and inevitably causes a side reaction whereby diethylene glycol is produced, showing that the compound is inferior to a trivalent antimony compound.

EXAMPLE 6

10,000 parts of dimethyl terephthalate and 7,500 parts of ethylene glycol were heated at temperatures of 150° C. to 220° C. under an atmosphere of nitrogen in the presence of 5 parts of calcium acetate to effect ester-interchange while methanol, thus produced, was continuously distilled off from the reaction mixture. The reaction was completed three hours after its initiation. The reaction product was then heated to remove an excess of ethylene glycol therefrom.

To the reaction product, 8 parts of trimethyl phosphate, 7 parts of dimethyltin diacetylacetonate and 5 parts of antimony trioxide (atomic ratio of Sn/Sb=0.6, atomic ratio of P/Sn=2.8) were added, each being in the form of a solution in ethylene glycol at a temperature of 240° C. The mixture was gradually vacuumed and finally, polycondensed at a temperature of 280° C. and at a reduced pressure of 2 mm. Hg over a period of 2 hours.

The resultant polymer was colorless and transparent. The fiber made therefrom was characterized by having a Y value of 91.4% and a PI value of 99.7% and had excellent whiteness and luster.

For comparison purpose, the polycondensation mentioned above was repeated wherein 8 parts of trimethyl phosphite (atomic ration of P/Sn=3.2) were used in place of trimethyl phosphate with all other conditions remaining the same. The resultant fiber was characterized by having a Y value of 88.7% and a PI value of 99.2%, showing that trimethyl phosphate, i.e. a pentavalent phosphorus compound is more effective than trimethyl phosphite, i.e. a trivalent phosphorus compound for the production of polyester having excellent whiteness and transparency.

EXAMPLE 7

9,000 parts of dimethyl terephtalate, 1000 parts of dimethyl isophthalate and 7,500 parts of ethylene glycol were heated in the presence of 7 parts of magnesium acetate under an atmosphere of nitrogen in the same manner as that of Example 6 to effect ester interchange.

To the reaction product, 8 parts of trimethyl phosphate, 6 parts of diphenyltin diacetate and 9 parts of antimony triethoxide were added, each being in the form of a solution in ethylene glycol (atomic ratios of Sn/Sb and P/Sn were 0.44 and 3.7, respectively). The mixture was polycondensed in the same manner as that of Example 6. The resultant polymer was colorless and transparent.

The fiber, made therefrom, was characterized by having a Y value of 92.2% and a PI value of 99.6% and had excellent whiteness and luster.

For comparison purpose, the process mentioned above was repeated wherein the polycondensation was performed without the addition of diphenyltin diacetate with all other conditions remaining same. The resultant polymer was tinged with dark grayish gray. The fiber made therefrom was characterized by having a Y value of 79.5% and a PI value of 98.3%.

EXAMPLE 8

8,500 parts of terephthalic acid, 5,100 parts of ethylene glycol, 5 parts of magnesium acetate and 5 parts of dibutyltin oxide were charged into an autoclave provided with a distillation apparatus. The mixture was heated at a temperature of 240° C. and a gauze pressure of 2.5 kg./cm.² under an atmosphere of nitrogen for 2 hours to effect esterification. The esterification was completed with the pressure being gradually reduced to normal.

To the reaction product, 9 parts of trimethyl phosphate and 4 parts of antimony trioxide were added in order, each being in the form of a solution in ethylene glycol (atomic ratios of Sn/Sb and P/Sn were 0.73 and 3.2, respectively). The mixture was gradually vacuumed with the temperatuse being increased over a period of 1 hour and then polycondensed at a temperature of 285° C. and at a pressure of 2 mm. Hg over a period of 1 hour.

The resultant polymer was tinged very slightly yellow, but transparent. The fiber made therefrom was characterized by having a Y value of 88.5% and a PI value of 99.3%.

For comparison purpose, the above process was repeated wherein esterification was performed for 3.5 hours without the addition of dibutyltin oxide with all other conditions remaining the same. The fiber made from the resultant polymer was characterized by having a Y value of 77.4% and a PI value of 98.2% and was quite dark.

What we claim is:

1. In a process for preparing a linear polyester having improved whiteness and transparency wherein glycol terephthalate is polycondensed in the presence of (1) a trivalent antimony compound and (2) a pentavalent phosphorus compound, an improvement comprising polycondensing glycol terephthalate in the presence of (3) at least one organotin compound having 2 to 24 carbon atoms and at least one Sn-C bond in the molecule in addition to (1) said trivalent antimony compound and (2) said phosphorus compound, the three compounds being miscible in the polycondensation system and present in the proportions satisfying the following atomic ratios:

Sn/Sb>0.2 and P/SN>1 and the amount of the antimony compound being within the range of 0.005% to 0.5% by weight based on the weight of the resulting polyester.

2. A process according to claim 1, wherein said antimony compound is at least one selected from antimony trioxide, antimony halide, antimony sulfide, antimonious acid and metal salt thereof, antimony glycoxide, antimony phenoxide, antimony alkoxide and antimony carboxylate.

3. A process according to claim 1, wherein said organotin compound is at least one selected from the compounds represented by the following formulae:

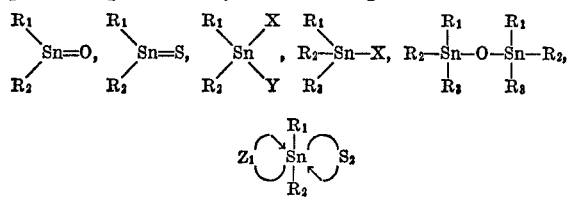

wherein $R_1$, $R_2$ and $R_3$ are identical with or different from each other and are selected from alkyl cycloalkyl and aryl groups each having 1 to 12 carbon atoms; X and Y are identical with or different from each other and are selected from halogen alkoxy group and aliphatic acid group each group having 1 to 12 carbon atoms; and $X_1$ and $Z_2$ are identical with or different from each other and are selected from β-diketone β-ketoester and 8-oxyquinoline groups.

4. A process according to claim 1, wherein said organotin compound is at least one selected from the compounds represented by the following formulae:

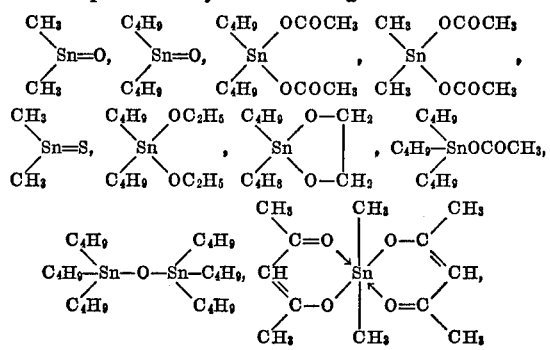

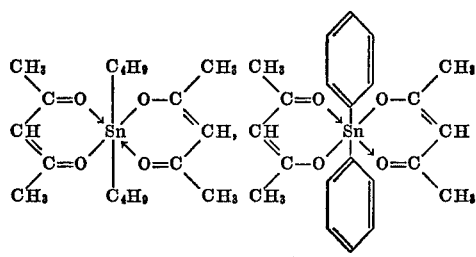

5. A process according to claim 1, wherein said pentavalent phosphorus compound is at least one compound selected from phosphoric acid and its alkyl or aryl ester, trialkylphosphine oxide, triarylphosphine oxide, alkylphosphonic acid and its alkyl or aryl ester, arylphosphonic acid and its alkyl or aryl ester.

6. A process according to claim 1, wherein said pentavalent phosphorus compound is at least one selected from trimethyl phosphate, triethyl phosphate, tributyl phosphate, triphenyl phosphate and tricresyl phosphate.

7. A process according to claim 1, wherein said three compounds are present in the proportions satisfying the following atomic ratios;

$$Sn/Sb = 0.3{-}4 \text{ and } P/Sn = 1.5{-}10$$

8. A process according to claim 1 wherein said glycol terephthalate is at least one selected from ethylene glycol terephthalate, 1,4-butanediol terephthalate and 1,4-cyclohexanedimethanol terephthalate.

9. A process according to claim 1, wherein said glycol terephthalate is further condensed together with minor amounts of at least one copolycondensation component selected from phthalic acid, isophthalic acid, adipic acid, sebacic acid, diethylene glycol, neopentyl glycol, cyclohexane-1,4-dimethanol.

10. In a process for preparing a linear polyester having improved whiteness and transparency wherein glycol terephthalate is polycondensed in the presence of (1) a trivalent antimony compound and (2) a pentavalent phosphorus compound, an improvement comprising polycondensing glycol terephthalate in the presence of (1) at least one trivalent antimony compound selected from antimony trioxide, antimony triethoxide, antimony glycoxide and antimony acetate, (2) at least one organotin compound selected from dimethyltin oxide, dibutyltin oxide, dimethyltin sulfide, dimethyltin diacetate, dimethyltin diacetylacetonate, dibutyltin diacetylacetonate and dibutyltin diethoxide, and (3) at least one pentavalent phosphorus compound selected from trimethyl phosphate, tributyl phosphate, triphenyl phosphate, the three compounds being present in the proportions satisfying the following atomic ratios:

$$Sn/Sb = 0.3{-}4 \text{ and } P/Sn = 1.5{-}10$$

and the amount of the antimony compound being within the range of 0.005% to 0.5% by weight based on the weight of the resulting polyester.

References Cited
UNITED STATES PATENTS

| | | | |
|---|---|---|---|
| 2,720,507 | 10/1955 | Caldwell | 260—75 |
| 2,650,213 | 8/1953 | Hofrichter | 260—75 |

FOREIGN PATENTS

| | | |
|---|---|---|
| 1,566,217 | 5/1969 | France. |

OTHER REFERENCES

Chem. Abstr. 7th Coll. Ind., 22, 344 (1970).

MELVIN GOLDSTEIN, Primary Examiner

UNITED STATES PATENT OFFICE
CERTIFICATE OF CORRECTION

Patent No. 3,796,691   Dated March 12, 1974

Inventor(s) KAZUYA CHIMURA ET AL

It is certified that error appears in the above-identified patent and that said Letters Patent are hereby corrected as shown below:

Column 4, line 33, change "hte" to --the--

Column 7, in Table III, Example 5, change "$(Bu)_2Sn(OAc^1)_2$" to --$(Bu)_2Sn(OAc)_2^1$--

Column 7, in Table III, Control 7, change:

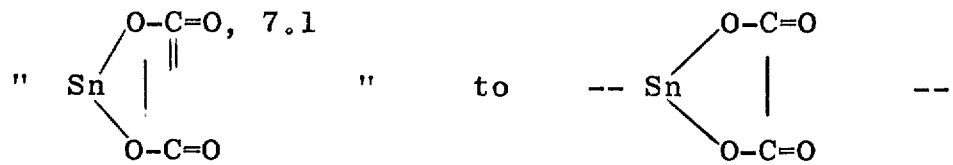

Column 8, line 69, change "P/SN >1" to -- $\frac{P}{Sn} > 1$ --

Column 9, lines 10-13, change:

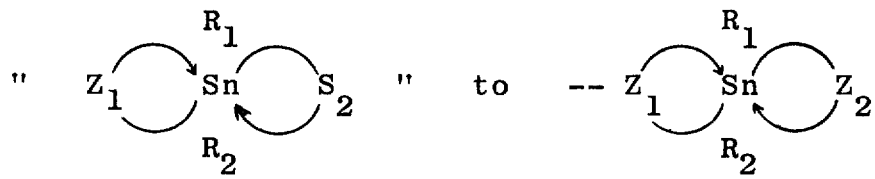

Column 9, line 18, after "halogen" insert a comma -- , -- line 19, change "$X_1$" to --$Z_1$--

UNITED STATES PATENT OFFICE
CERTIFICATE OF CORRECTION

Patent No. 3,796,691   Dated March 12, 1974

Inventor(s) KAZUYA CHIMURA ET AL

It is certified that error appears in the above-identified patent and that said Letters Patent are hereby corrected as shown below:

Column 9, lines 29-32, change:

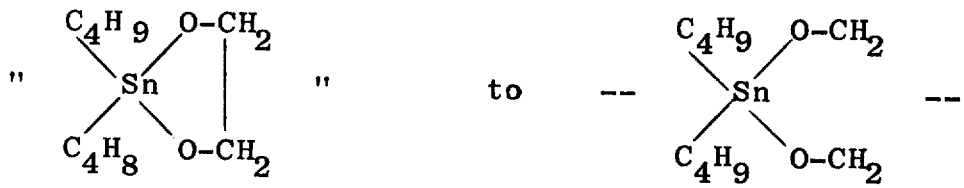

Column 9, lines 39-49, change:

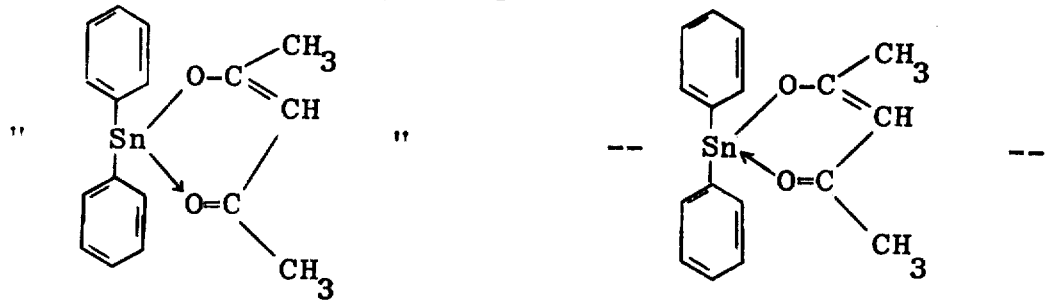

Signed and sealed this 1st day of July 1975.

(SEAL)
Attest:

RUTH C. MASON
Attesting Officer

C. MARSHALL DANN
Commissioner of Patents
and Trademarks